United States Patent [19]
Yamunachari et al.

[11] Patent Number: 5,822,534
[45] Date of Patent: Oct. 13, 1998

[54] METHOD AND APPARATUS FOR SELECTIVELY UNMANAGING ELEMENTS ON A NETWORK

[75] Inventors: Sundararajan Yamunachari; Govindarajan Rangarajan, both of Sunnyvale, Calif.

[73] Assignee: Sun Microsystems, Inc., Mountain View, Calif.

[21] Appl. No.: 661,581

[22] Filed: Jun. 4, 1996

[51] Int. Cl.[6] .................................................. G06F 15/177
[52] U.S. Cl. ................................ 395/200.54; 395/200.53; 245/326
[58] Field of Search ......................... 395/200.32, 182.08, 395/200.53, 200.54, 200.31; 345/326, 334, 348

[56] References Cited

U.S. PATENT DOCUMENTS 5,301,336   4/1994   Kodosky et al. ........................ 395/800
5,488,716   1/1996   Schneider et al. .................. 395/182.08
5,572,640   11/1996  Schettler ................................. 395/140
5,655,081   8/1997   Bonnell et al. ..................... 395/200.32
5,682,523   10/1997  Chen et al. ............................. 395/600

OTHER PUBLICATIONS

Warrier et al., "The Common Management Information Services and Protocol Over TCPIIP CCMOTL", Network Working Group, RFC 1095, Apr. 1989, pp. 1–49.
Sun Microsystems, Inc., "Soltice X.400 and Solstice X.500 Technical Brief," April 1996, pp. 1–47.

*Primary Examiner*—Mehmet B. Geckil
*Attorney, Agent, or Firm*—Gary S. Williams; Flehr Hohbach Test Albritton & Herbert LLP

[57] ABSTRACT

Elements on a network are selectively unmanaged by a network manager. An element is not managed when it is placed in a Pending state. Traps and events from the element in the Pending state are handled but not processed. The element can be automatically placed in the Pending state if a trap or event has been generated by that element.

24 Claims, 3 Drawing Sheets

METHOD AND APPARATUS FOR SELECTIVELY UNMANAGING ELEMENTS ON A NETWORK

BACKGROUND OF THE INVENTION

The present invention relates to digital communications. More specifically, the present invention relates to network management.

Today, large numbers of personal computers and workstations are being interconnected with file servers, print servers, modems, hubs and other devices to form local area networks, metropolitan area networks and wide area networks. These networks allow the personal computers and workstations to share information and valuable resources among each other. Now more than ever, individuals and companies depend on networks to conduct business and to communicate with people around the world. Indeed, the network has become the computer.

Most networks use a network manager and some kind of Simple Network Management Protocol (SNMP) for network management. Among its management tasks, the network manager automatically monitors the status of the devices on the network. Predefined event requests are sent to the devices, which return data about device variables that need to be monitored.

The network manager also handles traps from the devices. A trap indicates the occurrence of a special event or a serious problem in a device. The network manger can handle a trap by changing a variable in the device's Management Information Base (MIB) or by notifying the operator (e.g., by sounding an alarm, printing out a report). For example, a printer runs out of paper and sends a trap to the network manager. In response to the trap, the network manager alters certain variables of the printer's NIB, commanding the printer to use another paper tray. The printer agent detects the changed variable and configures the printer to draw paper from a different tray. Printing continues.

In some cases, however, a problem cannot be fixed simply by changing a variable in the MIB. The device might have to be serviced or turned off. Until the problem is fixed or the device is turned off, the device continues sending the same trap to the network manager and the network manager continues notifying the operator. There is little value in notifying the operator more than once. However, continually sounding an alarm or printing out a report can be distracting and even irritating to the operator. This is a problem with current network managers.

A separate problem results from managing network elements that are inactive. It is wasteful to manage fifteen networks when only five need to be managed. However, it is very time consuming and expensive to remove ten networks from the network topology database of the network manager. Consequently, the inactive elements are polled for their MIB variables, and system resources are consumed.

SUMMARY OF THE INVENTION

These problems are overcome by the present invention. Apparatus for selectively unmanaging elements on a network comprises a computer having memory that stores a plurality of instructions. The instructions instruct the processor to handle traps and events from all of the elements but not to process the handled traps and events from selected elements.

A method of selectively unmanaging a network including a plurality of elements comprises the steps of displaying a view of at least one of the network elements; selecting from the view at least one element to be placed in a first state; handling traps for each selected element while that selected element is in the first state; and not responding to the handled traps for a selected element while that selected element is in the first state.

A method of unmanaging a network element in a Pending state comprises the steps of handling all traps and events for the element; and not processing the handled traps and events while the element is in the Pending state. The handled traps and events can be cleared or processed after the element is removed from the Pending state. Putting the element in a Pending state prevents new events and traps from changing the state of the element's glyph. The effects of the traps and events are not propagated to the parent. Additionally, putting the element in the Pending state prevents any signaling actions in connection with the element.

A computer storage medium stores a plurality of executable instructions which instruct a computer to selectively unmanage elements on a network. The plurality of instructions comprise instructions which instruct the computer to handle traps and events from the elements; and which instruct the computer to ignore all handled traps and events for selected elements.

DETAILED DESCRIPTION OF THE INVENTION

Figure 1:
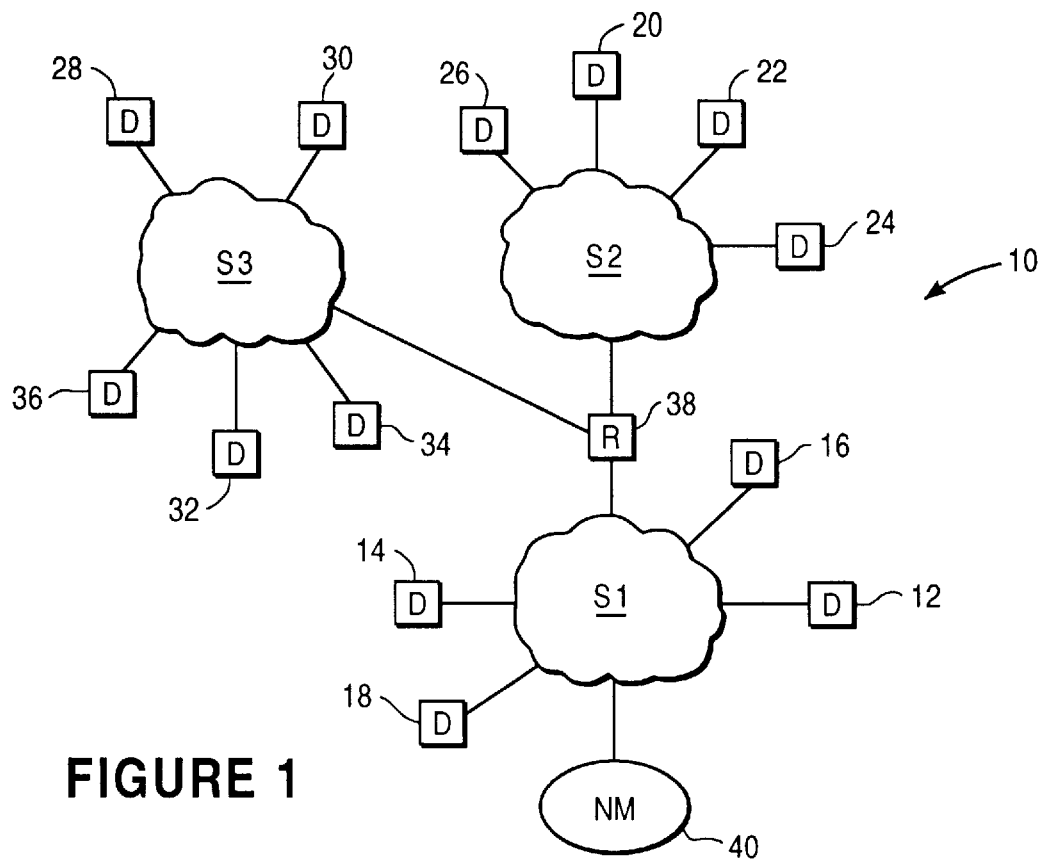
FIG. 1 is a schematic diagram of a network including a network manager according to the present invention.

FIG. 1 shows a network 10 which, for illustrative purposes, includes first, second and third subnets S1, S2 and S3. The subnets S1, S2 and S3 can have the same topology or they can have different topologies. The topologies include, but are not limited to, Token ring, Ethernet, X.25 and FDDI. Devices 12, 14,16 and 18 are connected to the first subnet S1; devices 20, 22, 24 and 26 are connected to the second subnet S2; and devices 28, 30, 32, 34 and 36 are connected to the third subnet S3. The devices 12–36 can be workstations, personal computers, hubs, printers, etc. An additional device on the network 10 include a first router 38 for interconnecting the first, second and third subnets S1, S2 and S3. The network 10 is scalable, which allows computing resources to be added as needed. Although only several devices 12–38 are shown, the network 10 can encompass tens of addressable devices up to tens of thousands of addressable devices.

TCP/IP is used to regulate how data is packeted into IP packets and transported between the devices 12–38. Each device 12–38 has a physical address and a unique Internet protocol (IP) address.

The network 10 also includes a network manager 40 that is connected to the first subnet S1. Simple Network Management Protocol(SNMP) is used by the network manager 40 for managing the devices 12–38 that support SNMP. The devices 12–38 that do not support SNMP can be managed by a protocol such as ICMP. Each SNMP-manageable device stores a MIB in its memory. The MIB is a collection of objects or variables representing different aspects of the device (e.g., configuration, statistics, status, control). Each device is associated with an agent, which is a software program that may or may not be resident in the device. The agents allow the network manager 40 to access the MIB of each SNMP-manageable device. Such accessibility allows the network manager 40 to perform its management tasks. For a general description of network management, see W. Stallings, "Data and Computer Communications", Mac-Millan (4th ed, 1994) pp. 701–24, which is incorporated herein by reference.

Figure 2:
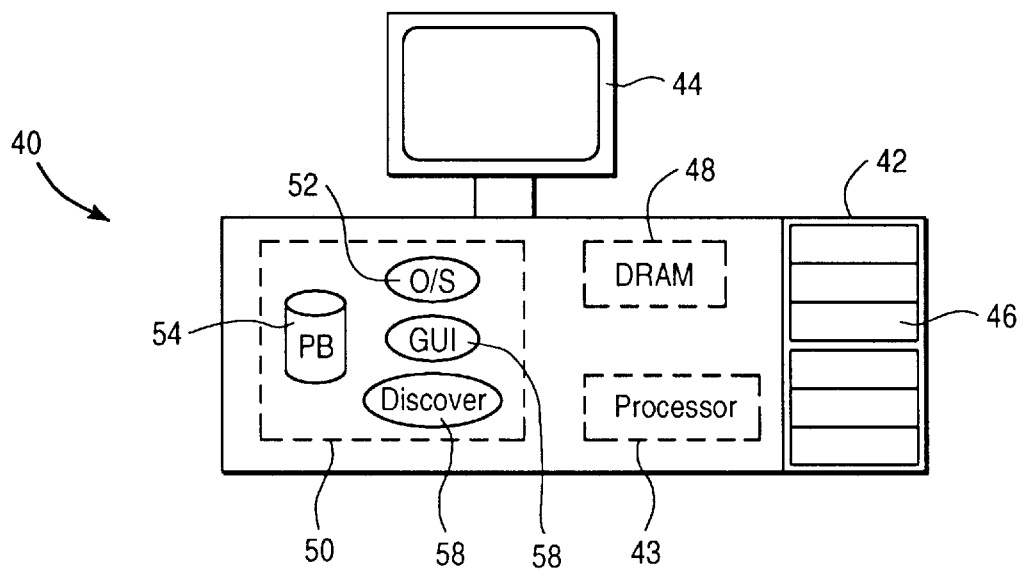
FIG. 2 is a block diagram of the network manager according to the present invention.

FIG. 2 shows the network manager 40 in greater detail. The network manager 40 includes a workstation 42 such as a SPARCstation™ or SPARCserver™. Both of these workstations use a RISC-based high-performance "SPARC" microprocessor. The SPARCstation™, SPARCserverm™, and "SPARC" microprocessor are all commercially available from Sun Microsystems, Inc., the assignee of the present invention. The workstation 42 is configured with a color display monitor 44 and a CD ROM drive K0 46 for distribution media. It is also configured with volatile memory 48 (e.g., 32 Mbytes of DRAM) and non-volatile memory 50 (e.g., a 400 Mbyte hard drive).

Software for the network manager includes a "UNIX"-based operating system 52. Operating systems for the "SPARC" microprocessor include "SOLARIS" 2.4 or greater and "SOLARIS" 1.x or later. The "SOLARIS" operating systems are also commercially available from the assignee of the present invention. The operating system is stored on a portable computer memory medium (e.g., a CD ROM) and loaded onto the non-volatile memory 50 from the CD ROM drive 46.

Additional software for the network manager 40 includes a network topology database 54, a Console program 56 that manages and displays the elements in the network topology database 54, and a Trap program 58 that handles traps for the Console program 56. The Console program 56 and Trap program 58 can also be stored on a portable computer medium and loaded onto the non-volatile memory 50 from the CD ROM drive 46. The network topology database 54 can be created dynamically by a discover tool, which is executed by the workstation 42.

Figure 3:
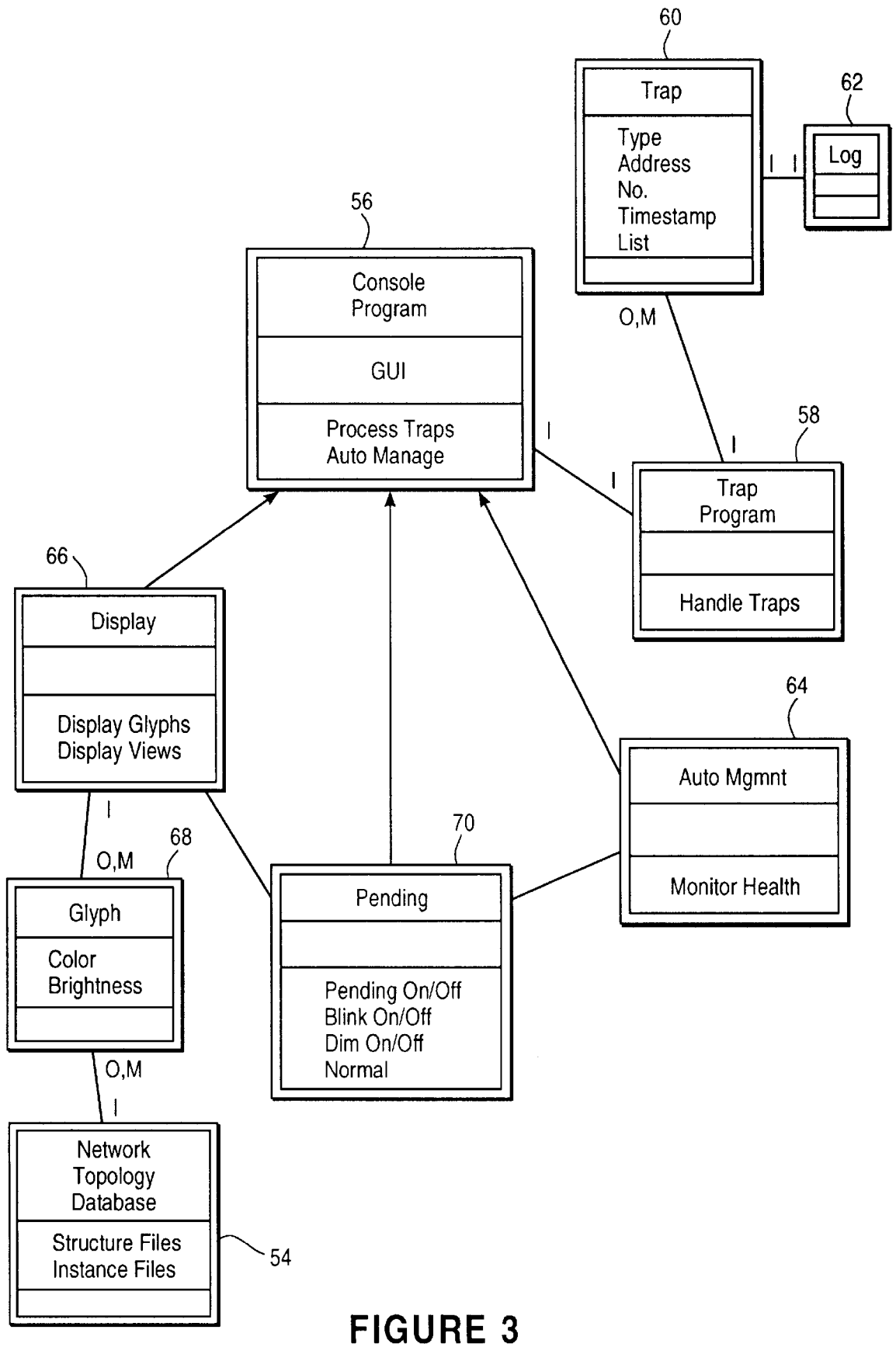
FIG. 3 is a static object oriented model of software that is executed by the network manager according to the present invention.

Referring now to FIG. 3, the network topology database 54 is a collection of structure or schema files and instance files that describe the elements of the network 10. Four basic elements are components (e.g., printers, routers, workstations), views (collections of elements, including other views), buses (e.g., a Token Ring segment) and connections (e.g., an RS-232 link). Structure files for other elements can be added to the network topology database 54. Each structure file includes a number of records that describe the structure of a particular element. The instance files contain instances of structure files for the elements that have been discovered on the system 10.

The Trap program 58 is a background daemon that translates each trap 60 from an element. Each trap 60 received by the Trap program 58 generally includes a field for:

(1) The type of element generating the trap 60.
(2) The address of the element generating the trap 60.
(3) The number of the specific trap (i.e., the trap number).
(4) The timestamp of when the trap 60 was generated.
(5) A variable binding list including MIB variables to be carried in the trap message and a character string describing the trap 60.

The Trap program 58 parses the information from the trap 60. The trap number and timestamp are saved in a log 62, which can be displayed by the Console program 56. Each type of trap 60 is logged only once. The log 62 can be displayed to allow a network administrator to see what kind of traps are happening and when they occur at the time the element is put in a "Pending" state. The Pending state will be described below. The variable binding list is forwarded by the Trap program 58 to other applications, including the Console program 56.

The Console program 56 includes an object-oriented, graphical user interface (GUI). The GUI can be derived from OpenWindows™ 3.1 or later or any other library of classes for GUIs.

The Console program 56 has an Auto Management feature 64 that monitors the health of the system 10. During Auto Management, the Console program 56 automatically polls the MIBs of selected elements in the network topology database 54. Predefined event requests using SNMP are started automatically against the selected elements. Response messages from the agents are returned when thresholds included in the event requests are exceeded. For example, if 10% disk space availability is the threshold, an agent will generate a Response message when the disk space on its corresponding file server falls below 10% availability. The Console program 56 processes the Response message and notifies the network administrator in a manner that is described below. The Auto Management feature 64 can be configured, automatically or by the network administrator, to send the event requests for specific events. One such event might cause the event requests to be sent every 60 seconds.

The Console program 56 also has a Display feature 66 that enables the elements in the network topology database 54 to be displayed. The elements are represented by glyphs 68. Glyphs 68 have attributes such as color and brightness that provide additional information about the element it represents.

Certain colors can notify a network administrator of events regarding an element. Perhaps the event was a router that went down, or a hard drive having less than 10% of disk space available, or a device not responding to a ping, or a device having an average CPU utilization exceeding 90%. A glyph for any of these devices could be colored red. If the average CPU utilization fell to 60% or the available disk space increased to 50%, the glyph could be changed to an orange color. If the average CPU utilization fell to 20% or the disk space availability increased to 70%, the color of the glyph could be changed to green.

The traps 60 could also be indicated by a color. For example, a yellow-colored glyph could indicate that a trap was logged for an element.

The Display feature 66 can display different views of the elements of the network 10. The views can be arranged in different ways. Views of desired system resources can be displayed. For example, a single view of all managed routers on the network could be displayed, regardless of the actual location of the routers in the network hierarchy. Or, views of elements can be arranged in a hierarchy to depict various levels of the network 10. The highest level of the hierarchy, the network 10, can be represented as a network glyph. The network administrator can "navigate" through the network 10 by simply pointing a mouse and double clicking the glyph. Double-clicking the network glyph would cause the Console program 56 to display the next level, which would include a number of cloud glyphs, one for each subnet S1, S2 and S3. Double-clicking a cloud glyph for one of the subnets (subnet S1, for example) would cause the Console program 56 to display an even lower level, which might show devices 12–18 connected to a bus.

The Console program 56 also includes a feature 70 for placing an element in a "Pending" state. An element is placed in a Pending state when it is desired not to manage that element or not to respond to traps from that element. An operator who is aware of a major problem with an element currently working on the same could put the element in the Pending state so as not to be bothered or informed of the same condition. The glyph 68 of the element is clicked, or appropriate menu items on the Console program 56 are selected, to produce a pop-up menu that offers the item "Glyph States." By selecting the menu item "Glyph States," another pop-up menu appears, giving the following selections for the element:

Pending on/off
Blink on/off
Dim on/off
Normal

Figure 4:
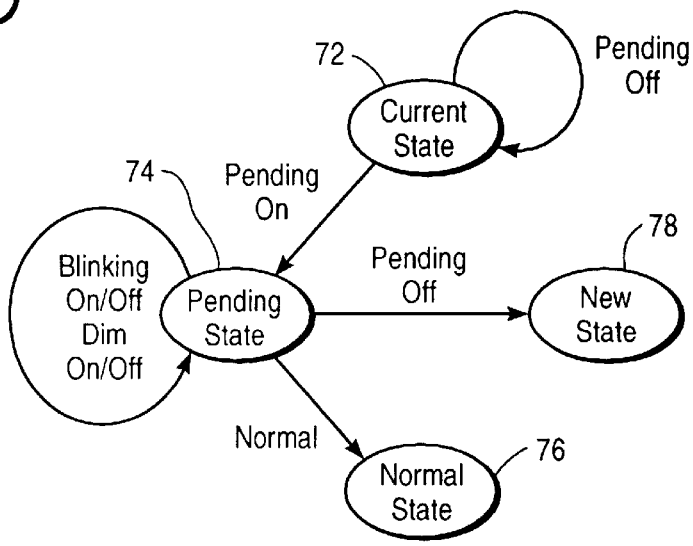
FIG. 4 is a state diagram of an element that is selectively unmanaged by the network manager according to the present invention.

Additional reference is made to FIG. 4, which shows the various states of an element. Before the element is placed in a Pending state 74 (i.e., when the element is in a "Current" state 72), the Console program 56 responds to all traps 60 from the Trap program 58. The Console program 56 also performs Automatic Management of the element.

Selecting the "Pending on" item causes the element to transition from the Current state 72 to the Pending State 74. A flag is created in the volatile memory 48 of the network manager 40. The flag indicates that the element is in a Pending state. When the flag is created, the Console program 56 clears all outstanding events and traps for the element and places the element into a "frozen" state. As long as the flag is in existence, new events and traps for the element are not processed by the Console program 56. Additionally, event and trap decays have no effect on an element in a Pending state 74. Because the flag is stored in volatile memory 48, any indication of the Pending state is lost if the network manager 40 is suddenly powered down.

If the "Blink on" item is selected, the glyph of the element is made to blink when displayed by the Display feature 70 of the Console Program 56. If the "Din on" item is selected, the glyph is dimmed. Although the "Blink" and "Dim" options are offered, any graphical representation could be used to represent a glyph of an element in a Pending state. For example, a glyph color could be selected to indicate a Pending state. Or, the glyph of an element could be displayed with a line or "X" drawn through it. Or, the glyph could be greyed out. The choice of representation is o left to the designer of the Console program 56.

If the "Normal" item is selected from the menu while the element is in the Pending state 74, the element is transitioned to a "Normal" state 76. The flag is destroyed and all outstanding traps and events for the element are cleared.

If the "Pending off" item is selected while the element is in the Pending state 74, the element is transitioned to a "New" state 78. The flag is destroyed and any outstanding traps and events for the element are processed. If traps or events for the element are outstanding, and the element happens to represent an end node or end device then, then a New state based on the outstanding traps and events for the element is calculated (e.g., a new report is generated and a new glyph color is calculated).

If the element is a child that is placed in a Pending state 72, the parent and siblings are not placed in Pending states 72. The Console program 56 still continues to respond to traps and it still continues to Auto Manage the parent and siblings. When the child is returned to the New state 78, a New state for the parent is calculated based on the traps for the child.

If the element is a parent that is placed in a Pending state 74, traps and events occurring on the children will have no effect on the parent. If the parent is returned to the Normal state 76, the traps are once again propagated to the parent.

Figure 5:
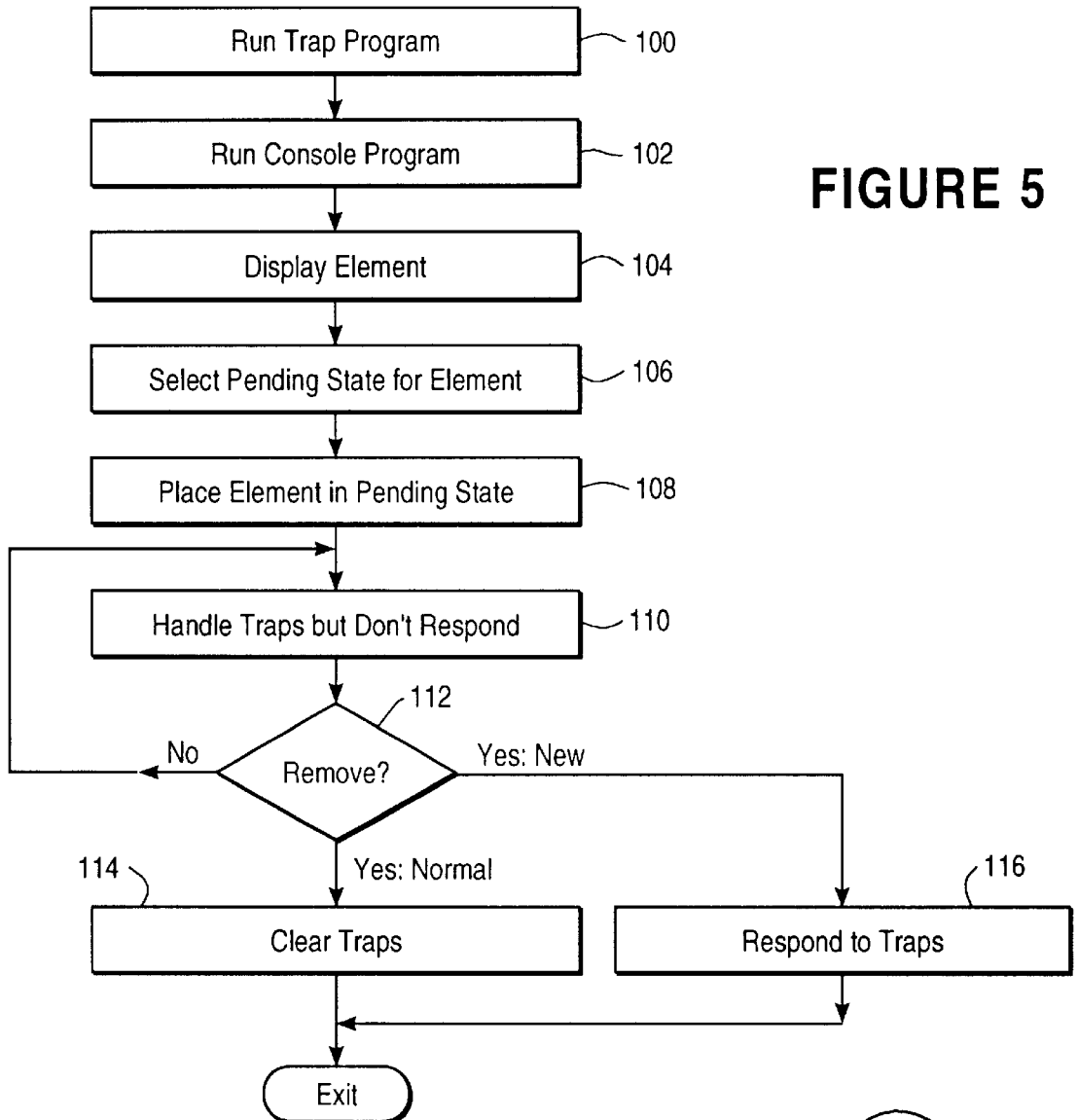
FIG. 5 is a flowchart of a method of unmanaging a network element according to the present invention.

FIG. 5 shows a method of unmanaging a network element. The Trap program 58 is run in the background (step 100) and the Console program 56 is executed (step 102). The Display feature 66 of the Console program 56 displays a view of the network 10. The network administrator navigates through the views of the network 10 until the element's glyph is displayed (step 104). Once the element's glyph is displayed, the network administrator clicks it on and selects the Pending state from the menu (step 106). The network manager 40, in turn, places the element in the Pending state (step 108). A flag for the element is created, and the glyph of the element is greyed out.

For as long as the element is in the Pending state, traps from the Trap program 58 are handled for the element, but the network manager 40 does not respond to the traps (step 110). Moreover, traps and events occurring on any children will have no effect on the element.

When the network administrator removes the element from the Pending state (step 112), the element can be placed in either a Normal state or a New state. If the Normal state is selected, the network manager 40 clears all outstanding events and traps for the element(step 114). If the New state is selected, the traps and events are processed for the element(step 116).

Figure 6:
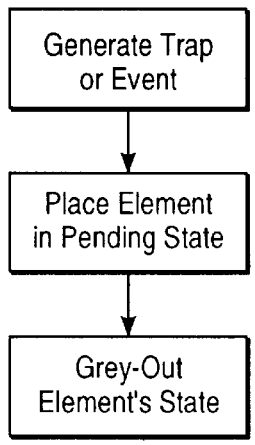
FIG. 6 is a flowchart of an automated method of selectively unmanaging elements on a network.

FIG. 6 shows an automated method of selectively unmanaging the elements. When a trap or event is generated for an element (step 200), the element is placed in a Pending state (step 202). The Console program 56 displays a greyed-out glyph (step 204), which indicates to the network administrator that the element was placed in a Pending state. An element could be automatically put into a Pending state as a result of an event or trap. However, the element cannot be removed automatically from the Pending state.

Thus disclosed is an apparatus and method of selectively unmanaging devices on a network. By placing an element in a Pending state, traps are handled but not processed. Even though the element continually sends traps, the network manager does not continually inform the operator of the traps. This removes a source of distraction to the operator. Additionally, Auto Management of inactive network elements can be disabled without having to remove the inactive elements from the network topology database. This allows precious system resources to be conserved.

It is understood that various changes and modifications may be made without departing from the spirit and scope of the invention. The invention is not limited to the system configuration shown in FIG. 1. Rather, the system can include any number and combination of devices that can be connected according to any topology. Moreover, the invention is not limited to network managers including workstations having RISC processors that run "UNIX"-based operating systems. For example, the network manager can include a personal computer having an x86 or "PENTIUM" processor that runs a 32-bit "UNIX"-based operating system such as "SOLARIS" 2.4. The operating system does not even have to be "UNIX"-based.

The software for the network manager is not limited to the objects or the object-oriented design shown in FIG. 3.

The software can be developed according to any methodology and any programming language.

Finally, management of the elements is not limited to the methods shown in FIGS. 5 and 6. Accordingly, the present invention is not limited to the precise embodiments described hereinabove. Instead, it is defined by the claims that follow.

We claim:

1. A network manager for selectively unmanaging elements in a network, comprising:
    a processor;
    a display; and
    a memory coupled to the processor, the memory storing
        a network topology database that describes the elements of the network, and
        a network management procedure, wherein the network management procedure causes the processor to:
        respond to traps and events from the elements,
        notify a user of received traps and events each time the traps and events are received,
        generate a graphical user interface on the display wherein glyphs represent the elements,
        place a first element in a Pending state,
        distinctively represent the glyph representing the first element on the graphical user interface on the display while the first element is in the Pending state, and
        stop all notifications to the user of all received traps and events for the first element while the first element is in the Pending state.

2. The network manager of claim 1 wherein the network management procedure causes the processor to allow the user to place the first element in the Pending state using the graphical user interface.

3. The network manager of claim 1 wherein the network management procedure causes the processor to automatically place the first element in the Pending state when a trap or event occurs.

4. The network manager of claim 1 wherein the network management procedure causes the processor to allow the user to select a desired distinctive representation for the glyphs representing elements in the Pending state.

5. The network manager of claim 4 wherein the selected desired distinctive representation is a blinking glyph.

6. The network manager of claim 5 wherein the selected desired distinctive representation is a greyed out glyph.

7. The network manager of claim 1 wherein the network management procedure causes the processor to:
    represent a subnet of elements with a subnet glyph,
    allow a user to place the subnet of elements represented by the subnet glyph in the Pending state using the graphical user interface, and
    distinctively represent the subnet glyph in the Pending state on the graphical user interface on the display.

8. The network manager of claim 1 wherein the elements are organized into parent elements and child elements, and the network management procedure causes the processor to
    propagate traps and events from child elements to their respective parent elements, and
    when a parent element is in the Pending state, traps and events from respective child elements of the parent element are not propagated to the parent element.

9. A method of selectively unmanaging elements in a network in a network management system having a processor, a display, and a memory, the memory storing a network management procedure executed by the processor, the network management procedure causing the processor to display a graphical user interface on the display, comprising the steps of:
    displaying elements of a network topology database on the graphical user interface wherein each element is represented by a glyph;
    receiving traps and events from the elements;
    notifying a user of received traps and events each time the traps and events are received,
    placing a first element in a Pending state;
    distinctively representing the glyph representing the first element on the graphical user interface; and
    stopping all notifications to the user of all traps and events for the first element, while the first element is in the Pending state.

10. The method of claim 9 wherein the user places the first element in the Pending state using the graphical user interface.

11. The method of claim 9 wherein the first element is automatically placed in the Pending state when a trap or event occurs.

12. The method of claim 9 further comprising the step of selecting a desired distinctive representation for the elements in the Pending state by the user.

13. The method of claim 12 wherein the selected desired distinctive representation is a blinking glyph.

14. The method of claim 12 wherein the selected desired distinctive representation is a greyed-out glyph.

15. The method of claim 9 further comprising the steps of:
    representing a subnet of elements with a subnet glyph;
    placing the subnet of elements represented by the subnet glyph in the pending state; and
    distinctively representing the subnet glyph in the Pending state on the graphical user interface on the display.

16. The method of claim 9 wherein the elements are organized into parent elements and child elements, and further comprising the steps of:
    propagating traps and events from child elements to the respective parent elements; and
    when a parent element is in the Pending state, traps and events from the respective child elements of the parent element are not propagated to the parent element.

17. A computer program product for use in conjunction with a computer system, the computer program product comprising a computer readable storage medium and a computer program mechanism embedded therein, the computer program mechanism comprising: a network management procedure including instructions for
    displaying elements of a network topology database on a graphical user interface on a display wherein each element is represented by a glyph; receiving traps and events from the elements;
    notifying a user of received traps and events each time the traps and events are received;
    placing a first element in a Pending state;
    distinctively representing the glyph representing the first element on the graphical user interface; and
    stopping all notifications to the user of all traps and events for the first element while the first element is in the Pending state.

18. The computer program product of claim 17 further including instructions for allowing the user to place the first element in a Pending state using the graphical user interface.

19. The computer program product of claim 17 further comprising instructions for automatically placing the first element in the Pending state when a trap or event occurs.

20. The computer program product of claim 17 further comprising instructions for selecting a desired distinctive representation for the elements in the Pending state by the user.

21. The computer program product of claim 20 wherein the selected desired distinctive representation is a blinking glyph.

22. The computer program product of claim 20 wherein the selected desired distinctive representation is a greyed-out glyph.

23. The computer program product of claim 17 further comprising instructions for:

representing a subnet of elements with a subnet glyph;

placing the subnet of elements represented by the subnet glyph in the pending state; and distinctively representing the subnet glyph in the Pending state on the graphical user interface on the display.

24. The computer program product of claim 17 wherein the elements are organized into parent elements and child elements, and further comprising instructions for:

propagating traps and events from child elements to the respective parent elements; and not propagating traps and events from the respective child elements to the parent element when the parent element is in the Pending state.

* * * * *